(12) United States Patent
Hedrick et al.

(10) Patent No.: US 12,474,519 B2
(45) Date of Patent: Nov. 18, 2025

(54) PHOTONICS CHIP PATTERNING WITH MULTIPLE PHOTORESIST LAYERS

(71) Applicant: GlobalFoundries U.S. Inc., Malta, NY (US)

(72) Inventors: Brittany Hedrick, Lagrangeville, NY (US); Ian Melville, Highland, NY (US); Michael David Webster, Poughkeepsie, NY (US); Harry Cox, Rifton, NY (US); Jorge Lubguban, Danbury, CT (US); Sarah Knickerbocker, East Fishkill, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 370 days.

(21) Appl. No.: 18/202,337

(22) Filed: May 26, 2023

(65) Prior Publication Data

US 2024/0393523 A1    Nov. 28, 2024

(51) Int. Cl.
G02B 6/12 (2006.01)
F21V 8/00 (2006.01)
G02B 6/122 (2006.01)

(52) U.S. Cl.
CPC ......... *G02B 6/0065* (2013.01); *G02B 6/1225* (2013.01); *G02B 6/1228* (2013.01); *G02B 6/12011* (2013.01)

(58) Field of Classification Search
CPC ..................................................... G02B 6/305
See application file for complete search history.

(56) References Cited

U.S. PATENT DOCUMENTS

| 5,764,832 A | 6/1998 | Tabuchi |
| 6,671,438 B2 * | 12/2003 | Ido ........................... G02B 6/30 |
| | | 385/49 |
| 6,760,520 B1 * | 7/2004 | Medin .................... G02B 6/423 |
| | | 385/88 |
| 9,305,867 B1 | 4/2016 | Or-Bach et al. |
| 2006/0018602 A1 | 1/2006 | Park et al. |
| 2009/0166772 A1 | 7/2009 | Hsieh et al. |

(Continued)

FOREIGN PATENT DOCUMENTS

WO    2010044746 A1    4/2010

OTHER PUBLICATIONS

European Patent Office, Communication pursuant to Article 94(3) EPC issued in European Patent Application No. 23209581.0 on Jun. 25, 2025; 6 pages.

(Continued)

*Primary Examiner* — Evren Seven
(74) *Attorney, Agent, or Firm* — Thompson Hine LLP; Anthony Canale

(57) ABSTRACT

Structures for a photonics chip that include a cavity or groove and methods of forming same. The structure comprises a semiconductor substrate including a first opening, a back-end-of-line stack on the semiconductor substrate, and a dielectric layer on the back-end-of-line stack. The back-end-of-line stack includes a pad, and the dielectric layer includes a second opening that extends to the pad. The structure further comprises an electrical interconnect inside the second opening in the dielectric layer. The electrical interconnect includes a sidewall that is separated in a lateral direction from the dielectric layer by a gap.

20 Claims, 10 Drawing Sheets

(56) References Cited

U.S. PATENT DOCUMENTS

| | | | |
|---|---|---|---|
| 2017/0108643 A1* | 4/2017 | Budd | G02B 6/423 |
| 2019/0369339 A1* | 12/2019 | Knickerbocker | G02B 6/4239 |
| 2022/0268997 A1* | 8/2022 | Debregeas | G02B 6/14 |
| 2022/0381986 A1* | 12/2022 | Young | G02B 6/1221 |
| 2023/0400634 A1* | 12/2023 | Tran | H01S 5/1014 |
| 2025/0155648 A1* | 5/2025 | Shao | G02B 6/4239 |
| 2025/0199251 A1* | 6/2025 | Wang | G02B 6/4243 |
| 2025/0208348 A1* | 6/2025 | Ndieguene | G02B 6/4286 |

OTHER PUBLICATIONS

European Patent Office, Extended European Search Report and Opinion issued in European Patent Application No. 23209581.0 on Apr. 16, 2024; 7 pages.

\* cited by examiner

PHOTONICS CHIP PATTERNING WITH MULTIPLE PHOTORESIST LAYERS

BACKGROUND

The disclosure relates to photonics chips and, more specifically, to structures for a photonics chip that include a cavity or groove and methods of forming same.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

The functionality of a photonics chip requires electrical interconnects and optical interconnects that can be formed without compromising each other. In that regard, photonics chips include electrical interconnects that are formed by lithography and plating in the presence of an optical interconnect. The optical interconnect often included a large opening, such as a groove for a tip portion of an optical fiber or a cavity for a laser chip, that is patterned in the photonics chip before forming the electrical interconnects. Any reduction in size of an electrical interconnect is limited by the lithography resolution of the photoresist that is needed to cover and protect the large opening for the optical interconnect during the formation of the electrical interconnect.

Improved structures for a photonics chip that include a cavity or groove and methods of forming same are needed.

SUMMARY

In an embodiment of the invention, a structure for a photonics chip is provided. The structure comprises a semiconductor substrate including a first opening, a back-end-of-line stack on the semiconductor substrate, and a dielectric layer on the back-end-of-line stack. The back-end-of-line stack includes a pad, and the dielectric layer includes a second opening that extends to the pad. The structure further comprises an electrical interconnect inside the second opening in the dielectric layer. The electrical interconnect includes a sidewall that is separated in a lateral direction from the dielectric layer by a gap.

In an embodiment of the invention, a method of forming a structure for a photonics chip is provided. The method comprises forming a first opening in a semiconductor substrate of the photonics chip, forming a first photoresist layer that bridges the first opening on a first portion of the photonics chip, and forming a second photoresist layer on a second portion of the photonics chip. The first photoresist layer comprises a dry-film photoresist, and the second photoresist layer comprises a liquid-based photoresist. The method further comprises patterning the second photoresist layer to form a second opening that extends to an area on the photonics chip.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
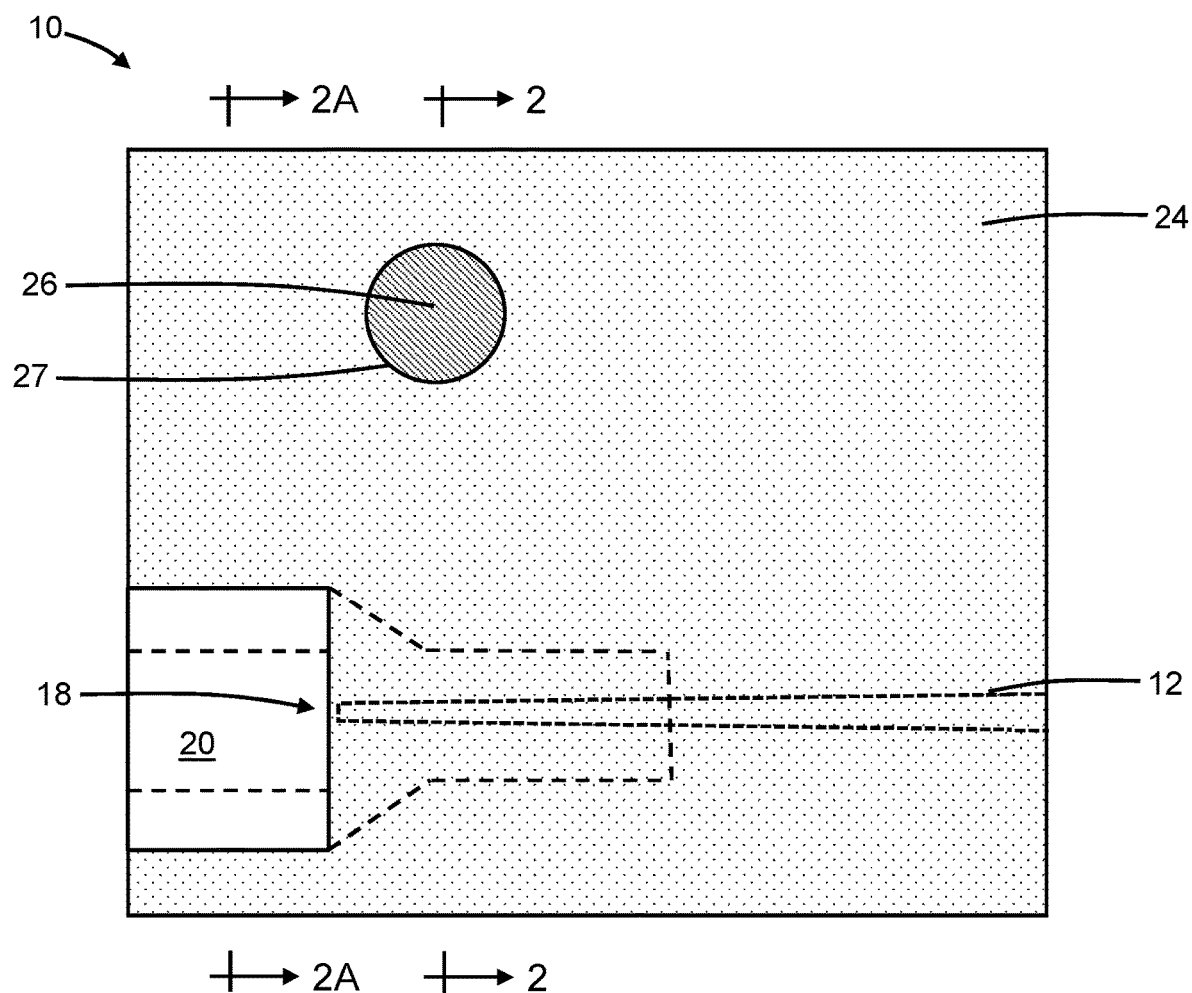
FIG. 1 is a top view of a structure for a photonics chip at an initial fabrication stage of a processing method in accordance with embodiments of the invention.
Figure 2:
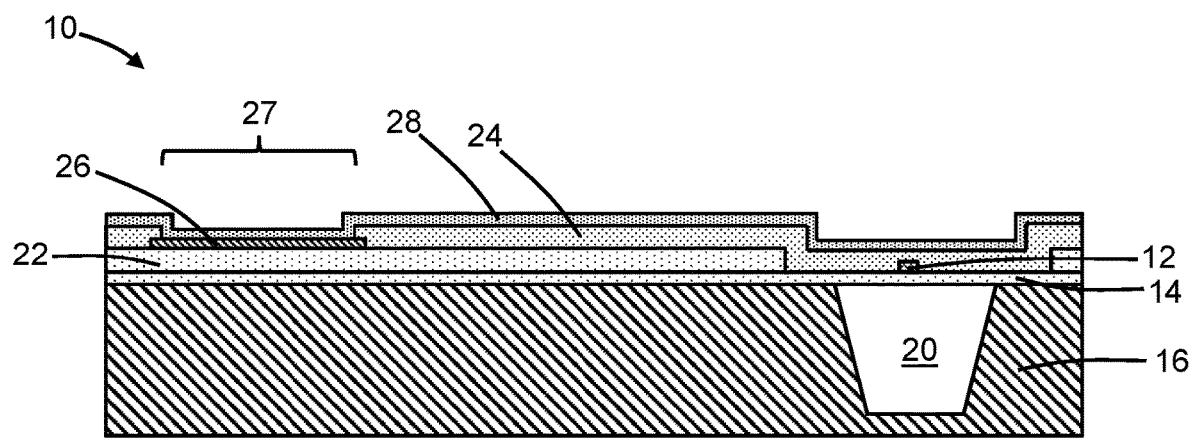
FIG. 2 is a cross-sectional view of the structure taken generally along line 2-2 in FIG. 1.
Figure 2A:
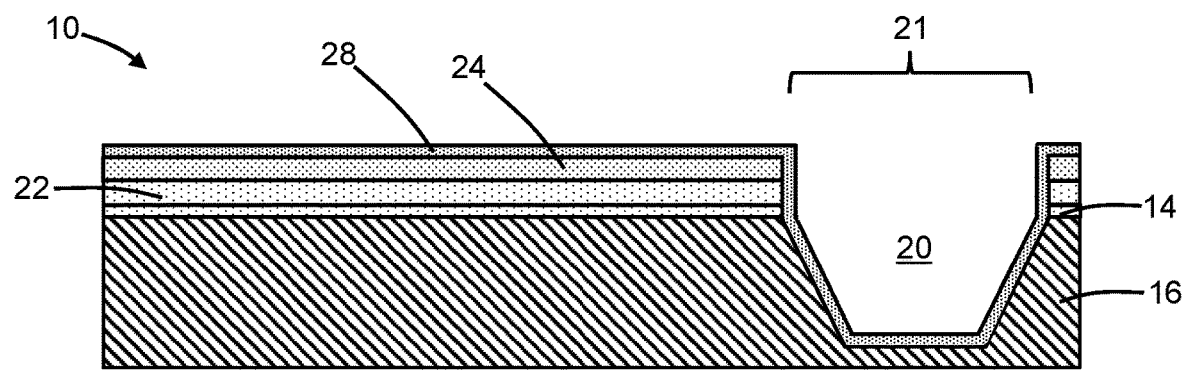
FIG. 2A is a cross-sectional view of the structure taken generally along line 2A-2A in FIG. 1.

With reference to FIGS. 1, 2, 2A and in accordance with embodiments of the invention, a structure 10 for a photonics chip includes a waveguide core 12 that is positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate, and the dielectric layer 14 may fully separate the waveguide core 12 from the semiconductor substrate 16.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride. In alternative embodiments, other materials, such as a III-V compound semiconductor, may be used to form the waveguide core 12.

In an embodiment, the waveguide core 12 may be formed by patterning a layer with lithography and etching processes. In an embodiment, a patterned etch mask may be formed by a lithography process over the layer, and unmasked sections of the layer may be etched and removed with an etching process. The masked sections of the layer may determine the patterned shape of the waveguide core 12. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of the material (e.g., silicon nitride).

In an embodiment, the waveguide core 12 may include a tapered section defining an edge coupler 18. The tapered section of the waveguide core 12 may be an inverse taper having a width dimension that increases with increasing distance from a facet at its terminating end. Alternatively, the edge coupler 18 may be a spot-size converter that includes a set of segments disposed in a grating-like structure. In an embodiment, the edge coupler 18 may be configured to receive light from a light source that is routed by the waveguide core 12 to a photonic integrated circuit on the photonics chip.

The structure 10 may include an opening 20 defined in the semiconductor substrate 16, a back-end-of-line stack 22 on the semiconductor substrate 16, and a dielectric layer 24 on the back-end-of-line stack 22. The back-end-of-line stack 22 may include stacked dielectric layers in which each individual dielectric layer is comprised of a dielectric material, such as silicon dioxide, silicon nitride, tetraethylorthosilicate silicon dioxide, or fluorinated-tetraethylorthosilicate silicon dioxide. The dielectric layer 24 may be comprised of a dielectric material, such as silicon dioxide.

The opening 20 includes a portion adjacent to the edge coupler 18. The opening 20 has an entrance 21 and sidewalls that extend from the entrance 21 into the semiconductor substrate 16. The opening 20 may include a portion that extends in the semiconductor substrate 16 as an undercut beneath the dielectric layer 14 and below an overlying portion of the edge coupler 18. In an embodiment, the opening 20 may be a groove in the semiconductor substrate 16 that is configured to receive an end portion of an optical fiber. In an embodiment, the opening 20 may be a cavity in the semiconductor substrate 16 that is configured to receive a laser chip.

Lithography and etching processes may be used to form the opening 20 in the semiconductor substrate 16, and to also form holes (not shown) that extend through the dielectric layer 24 and the back-end-of-line stack 22 into the semiconductor substrate 16 adjacent to the edge coupler 18. The semiconductor substrate 16 beneath the edge coupler 18 may be etched through the holes by an etching process, such as a sulfur hexafluoride plasma, to provide the undercut as an extension of the opening 20. A wet chemical etchant, such as a solution containing tetramethylammonium hydroxide, may be used to provide the opening 20 in the semiconductor substrate 16 with a V-shape or U-shape. The wet chemical etchant may exhibit etch selectivity with respect to crystal orientation of the semiconductor material of the semiconductor substrate 16 and may be characterized by different etching rates in different crystalline directions, which produces the V-shape or U-shape.

A pad 26 may be formed in an uppermost metallization level of the back-end-of-line stack 22. The pad 26 may be coupled to one or more interconnects in lower metallization levels of the back-end-of-line stack 22. In an embodiment, the pad 26 may be comprised of aluminum. An opening 27 may be included in the dielectric layer 24. The opening 27 extends through the dielectric layer 24 to a portion of the photonics chip. In an embodiment, the opening 27 extends fully through the dielectric layer 24 to the pad 26. The opening 27 in the dielectric layer 24 may reveal at least a portion of the pad 26. The revealed portion of the pad 26 may have a surface area that is surrounded by the opening 27.

A layer 28 may be formed over the dielectric layer 24, the pad 26 inside the opening 27, and the portion of the opening 20 adjacent to the edge coupler 18. The layer 28 may be comprised of a conformal layer stack of metals, such as a layer comprised of copper and a layer comprised of a titanium-tungsten alloy.

Figure 3:
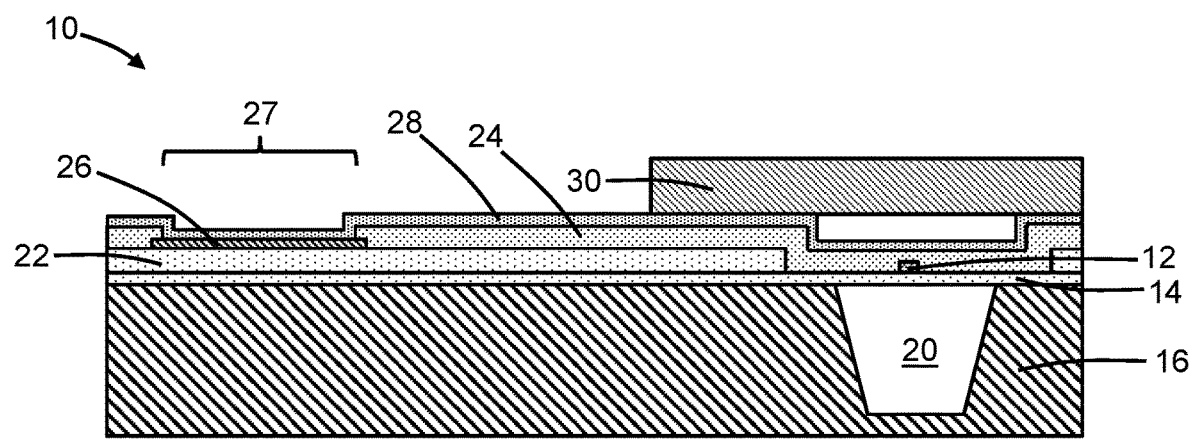
FIGS. 3, 3A are cross-sectional views of the structure at a fabrication stage subsequent to FIGS. 2, 2A.
Figure 3A:
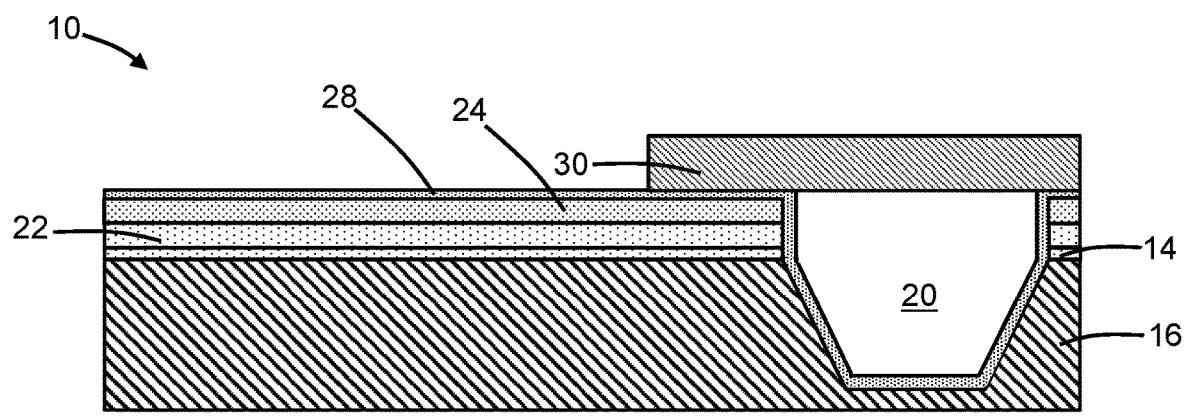

With reference to FIGS. 3, 3A in which like reference numerals refer to like features in FIGS. 2, 2A and at a subsequent fabrication stage, a photoresist layer 30 may be formed on a portion of the photonics chip. In particular, the photoresist layer 30 may be formed on a portion of the photonics chip that includes the opening 20. The photoresist layer 30 may span and bridge across the opening 20. In an embodiment, the photoresist layer 30 may bridge across the entirety of the opening 20 such that the entrance 21 is blocked. Adjacent to the opening 20, the photoresist layer 30 may be positioned on the dielectric layer 24 and in contact with the layer 28 coating the dielectric layer 24. The opening 27 in the dielectric layer 24 is unblocked and, for that reason, the pad 26 is revealed after the photoresist layer 30 is formed.

In an embodiment, the photoresist layer 30 may be comprised of a dry-film photoresist containing a solid photosensitive material that can be patterned by being exposed to light projected through a photomask and developed with a chemical developer. In an embodiment, the photoresist layer 30 may be comprised of a dry-film photoresist that is applied as a sheet and patterned.

Figure 4:
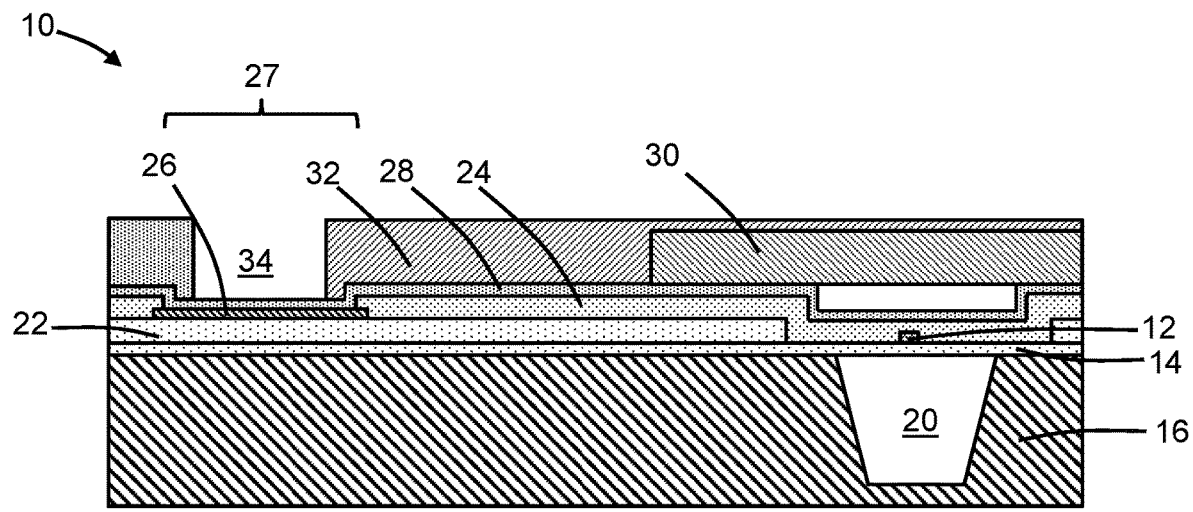
FIGS. 4, 4A are cross-sectional views of the structure at a fabrication stage subsequent to FIGS. 3, 3A.
Figure 4A:
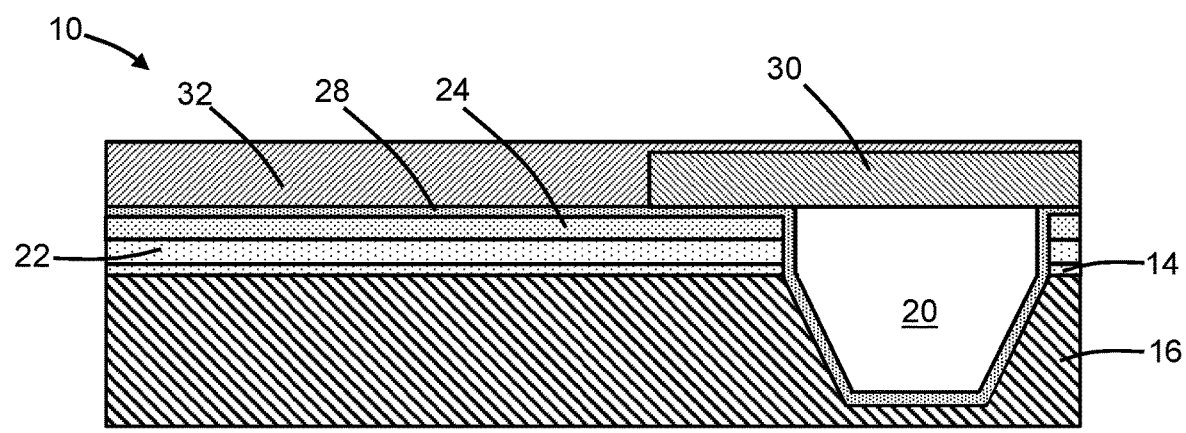

With reference to FIGS. 4, 4A in which like reference numerals refer to like features in FIGS. 3, 3A and at a subsequent fabrication stage, a photoresist layer 32 may be formed on all or a portion of the photonics chip. The photoresist layer 32, which includes a portion that is disposed inside the opening 27 on the layer 28 coating the pad 26, may be patterned to reveal a surface area of the layer 28 on the pad 26. In an embodiment, the photoresist layer 32 may form a continuous coating on the photonics chip aside from the surface area of the layer 28 on the pad 26 revealed by the opening 27. In an embodiment, the photoresist layer 32 may be characterized by a thickness that is different than the thickness of the photoresist layer 30 such that the respective thicknesses of the photoresist layers 30, 32 are unequal. The photoresist layer 30 and the photoresist layer 32 are both arranged on the dielectric layer 24 with the layer 28 separating the photoresist layers 30, 32 from the dielectric layer 24. In an embodiment, the photoresist layer 32 may be disposed in contact with the dielectric layer 24, the pad 26, the layer 28, and the photoresist layer 30. In an embodiment, portions of the photoresist layer 32 may be positioned on the layer 28 at the side edges of the pad 26.

In an embodiment, the photoresist layer 32 may be formed by liquid-based process. In an embodiment, the photoresist layer 32 may be comprised of a liquid-based spin-on photoresist applied by a spin-coating process, pre-baked, exposed to light projected through a photomask, baked after exposure, and developed with a chemical developer to define an opening 34 that extends to an area on the photonics chip, namely a portion of the pad 26. In an embodiment, the opening 34 in the photoresist layer 32 may be smaller than the opening 27 in the dielectric layer 24. In an embodiment, the photoresist layer 32 may be comprised of a liquid-based spray-coat photoresist applied by a spraying process, pre-baked, exposed to light projected through a photomask, baked after exposure, and developed with a chemical developer to define the opening 34 that extends to the portion of the pad 26.

The photoresist layer 30 is formed before the photoresist layer 32 is formed. The photoresist layer 30 occludes the opening 20 such that the liquid-based photoresist applied to form the photoresist layer 32 is blocked from entering the opening 20. In contrast to the formation of the photoresist layer 32, the formation of the photoresist layer 30 does not require application of a liquid-based material by, for example, a spin-on process or a spray-on process.

Figure 5:
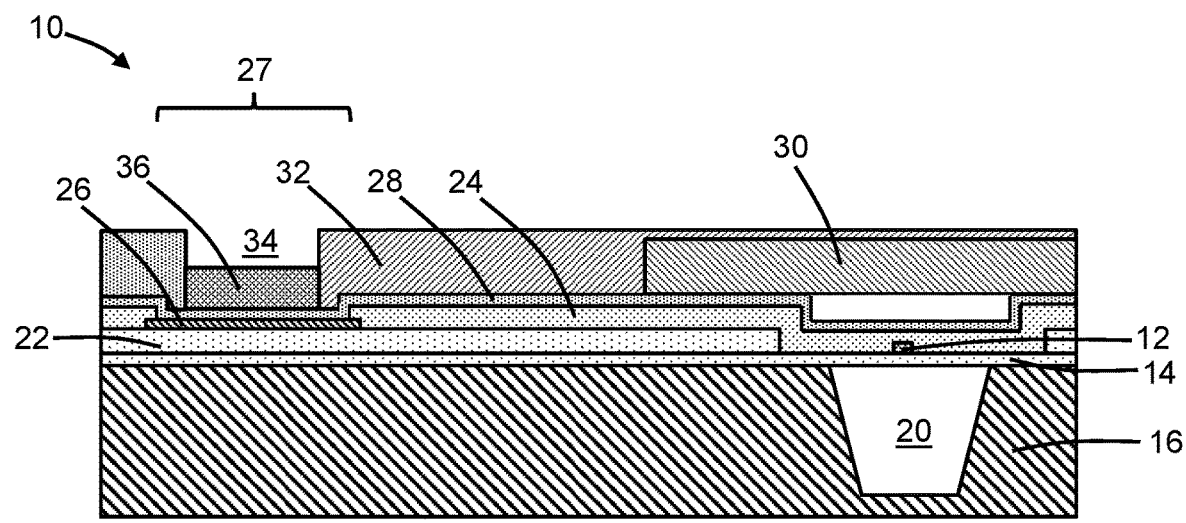
FIGS. 5, 5A are cross-sectional views of the structure at a fabrication stage subsequent to FIGS. 4, 4A.
Figure 5A:
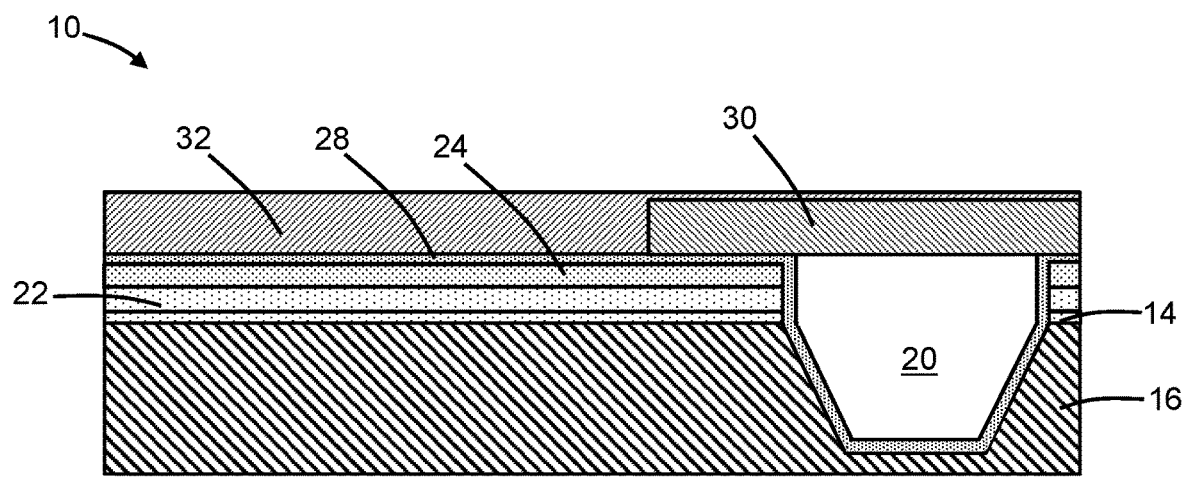

With reference to FIGS. 5, 5A in which like reference numerals refer to like features in FIGS. 4, 4A and at a subsequent fabrication stage, an electrical interconnect 36 is formed on the layer 28 coating the pad 26 and inside the openings 20, 27 in the presence of both photoresist layers 30, 32. The electrical interconnect 36 is coupled to the pad 26 by the intervening portion of the layer 28. The electrical interconnect 36 may be comprised of a conductor, such as copper or another low-resistivity metal or metal alloy, that is deposited by, for example, a plating process. The characteristics of the electrical interconnect 36, such as dimensions and geometry, are determined at least in part by the type of photoresist contained in the photoresist layer 32.

The use of multiple photoresist layers 30, 32, which are sequentially formed on the photonics chip, leverages the positive attributes of each type of photoresist. The photoresist layer 32 can be patterned to finer dimensions than the photoresist layer 30, which may permit the formation of smaller electrical interconnects, like the electrical interconnect 36, than possible with a dry film photoresist. The photoresist layer 30 bridges the opening 20 such that the liquid applied to form the photoresist layer 32 is blocked from entering the opening 20. In the absence of the photoresist layer 30, the photoresist layer 32 would be unable to bridge the opening 20 due to its topography and would insufficiently occlude the opening 20, which would result in a coverage discontinuity that would permit ingress of plating solution into the opening 20 during a plating process.

Figure 6:
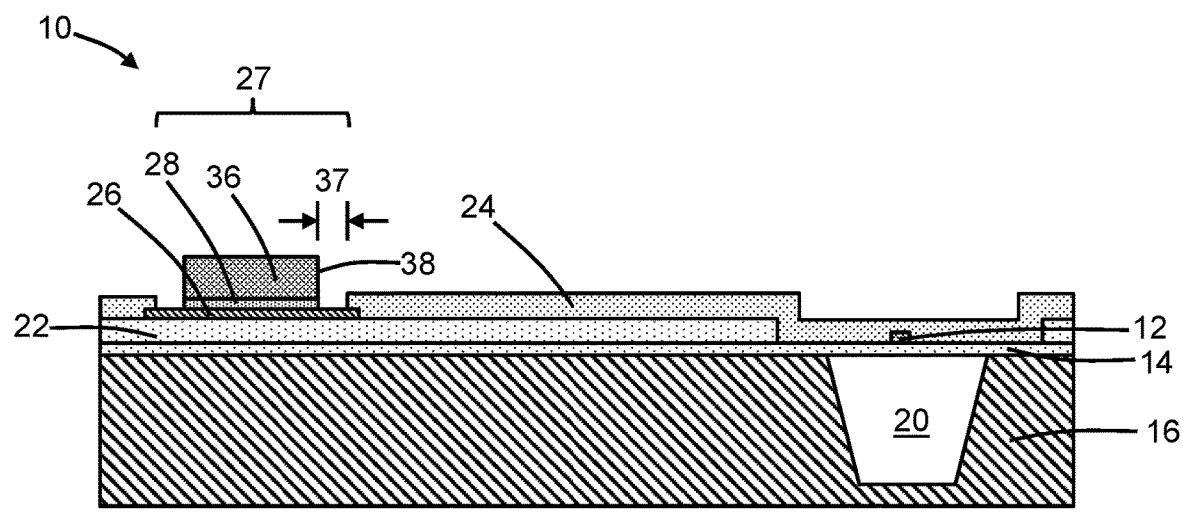
FIGS. 6, 6A are cross-sectional views of the structure at a fabrication stage subsequent to FIGS. 5, 5A.
Figure 6A:
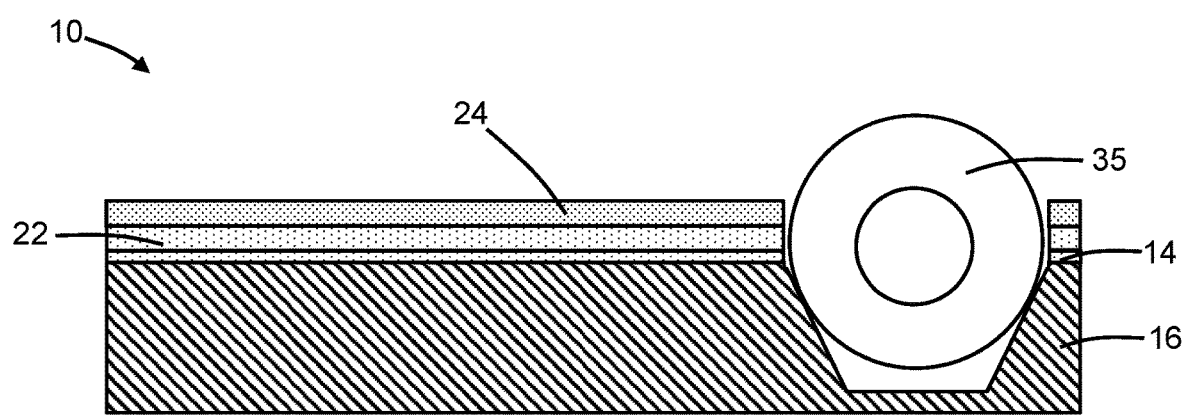

With reference to FIGS. 6, 6A in which like reference numerals refer to like features in FIGS. 5, 5A and at a subsequent fabrication stage, the patterned photoresist layer 30 and the patterned photoresist layer 32 are stripped and removed after the electrical interconnect 36 is formed. The electrical interconnect 36 is positioned on a portion of the pad 26 that is surrounded by perimeter of the opening 27 in the dielectric layer 24. The layer 28 is removed by an etching process from surface areas on the photonics chip that are not masked by the electrical interconnect 36 to expose the dielectric layer 24.

The electrical interconnect 36 has a sidewall or side edge 38 that is laterally spaced from an adjacent portion of the dielectric layer 24 at the sidewall of the opening 27 by gaps 37. The gaps 37 represent spaces inside the opening 27 originating from the liquid-based spin-on photoresist of the photoresist layer 32 being formed inside the opening 27 and then patterned as part of the lithography and plating processes used to form the electrical interconnect 36.

An optical fiber 35 may include a tip portion that is placed into the opening 20 adjacent to the edge coupler 18. The shape of the sidewalls of the opening 20 and the depth of the opening 20 may cooperate to self-align the core of the optical fiber 35 with the facet at the end of the edge coupler 18 as the optical fiber 35 is placed into the opening 20. The optical fiber 35 may be secured to the sidewalls of the opening 20 by an adhesive, such as an adhesive that may be cured by ultraviolet light exposure. In an embodiment, the optical fiber 35 may be included in a set of optical fibers that are inserted into multiple openings 20 formed in the photonics chip.

Figure 7:
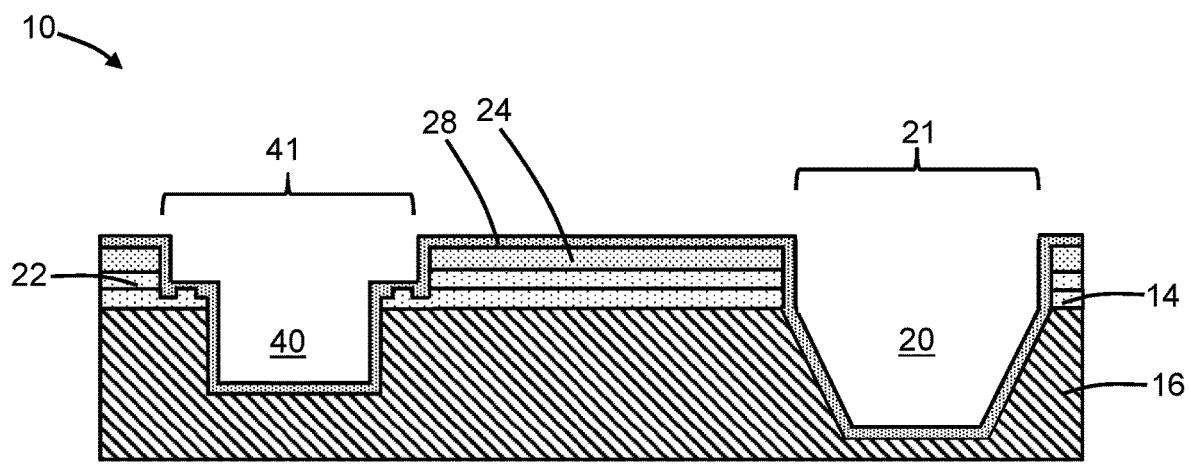
FIG. 7 is a cross-sectional view of a structure for a photonics chip at an initial fabrication stage of a processing method in accordance with alternative embodiments of the invention.

With reference to FIG. 7 and in accordance with alternative embodiments of the invention, the structure 10 may include an opening 40 that is formed in the semiconductor substrate 16, back-end-of-line stack 22, and dielectric layer 24. The opening 40 may be formed by patterning with lithography and etching processes. In an embodiment, the opening 40 may be a cavity that is configured to receive a chip, such as a laser chip or a semiconductor optical amplifier chip. The opening 40 includes an entrance 41 and sidewalls that extend from the entrance 41 into the semiconductor substrate 16. In an embodiment, the opening 40 may be surrounded on its sides and from below by the semiconductor material of the semiconductor substrate 16.

Figure 8:
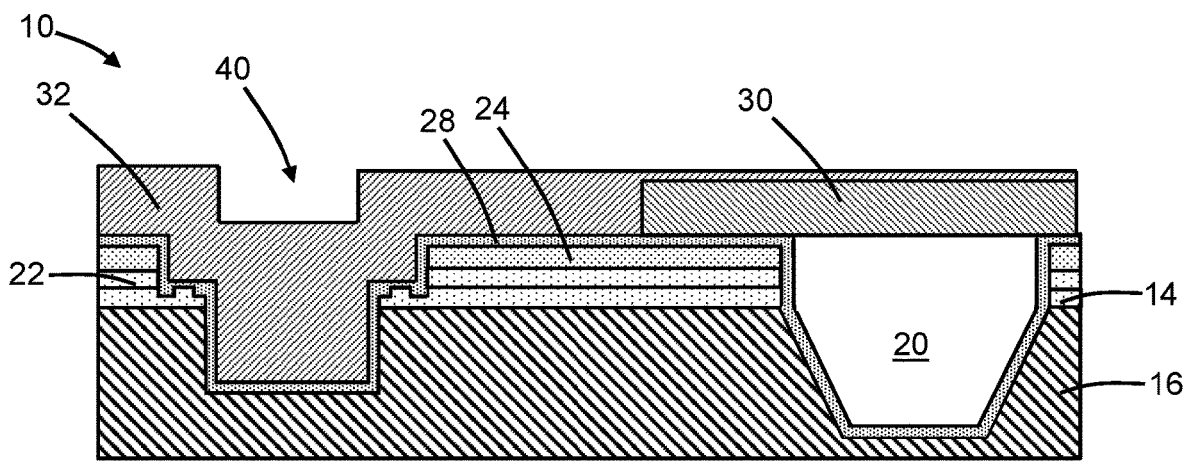
FIG. 8 is a cross-sectional view of the structure at a fabrication stage subsequent to FIG. 7.

With reference to FIG. 8 in which like reference numerals refer to like features in FIG. 7 and at a subsequent fabrication stage, the photoresist layer 30 is formed, as described in connection with FIGS. 3, 3A, that bridges across the opening 20. The photoresist layer 32 is then formed, as described in connection with FIGS. 4, 4A, that includes a portion positioned inside the opening 40. The photoresist layer 32 is formed on the layer 28 with the photoresist layer 30 occluding the opening 20.

Figure 9:
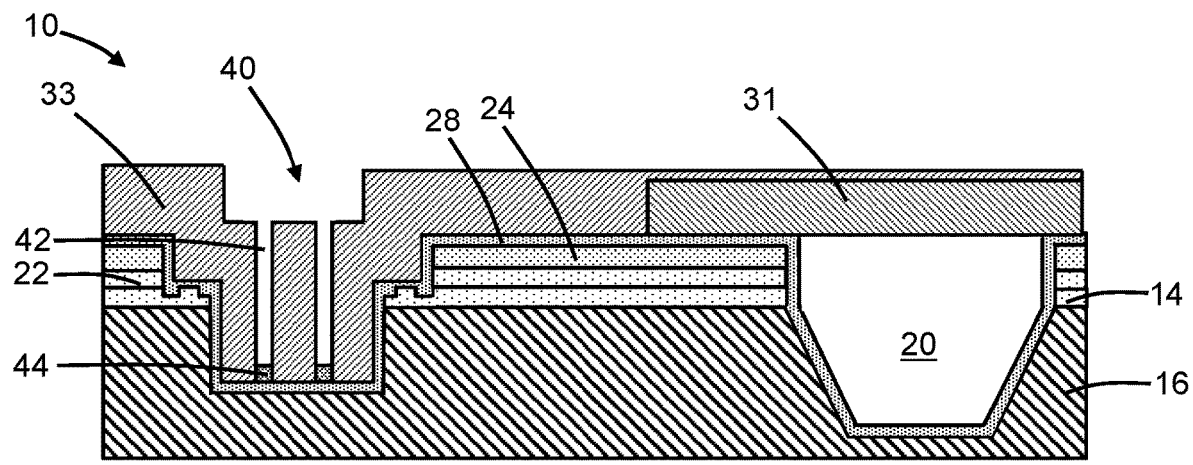
FIG. 9 is a cross-sectional view of the structure at a fabrication stage subsequent to FIG. 8.

With reference to FIG. 9 in which like reference numerals refer to like features in FIG. 8 and at a subsequent fabrication stage, the portion of the photoresist layer 32 inside the opening 40 may be patterned to include openings 42 that extend to areas of the photonics chip, namely respective surface areas of the layer 28 at the bottom of the opening 40. Electrical interconnects in the representative form of redistribution layers 44 are formed on portions of the layer 28 inside the openings 34 in the photoresist layer 32. The redistribution layers 44 may be used to establish electrical connections to a chip that is subsequently inserted into the opening 40. For example, the redistribution layers 44 may include traces (not shown) that extend up one or more of the sidewalls of the opening 40 to pads located on a top surface of the dielectric layer 24.

The redistribution layers 44 are electrically and physically coupled to the layer 28. The redistribution layers 44 may be comprised of one or more metals, such as copper, nickel, and/or gold, that are deposited by, for example, a plating process. The characteristics of the redistribution layers 44, such as dimensions and geometry, are determined at least in part by the type of photoresist contained in the photoresist layer 32.

Figure 10:
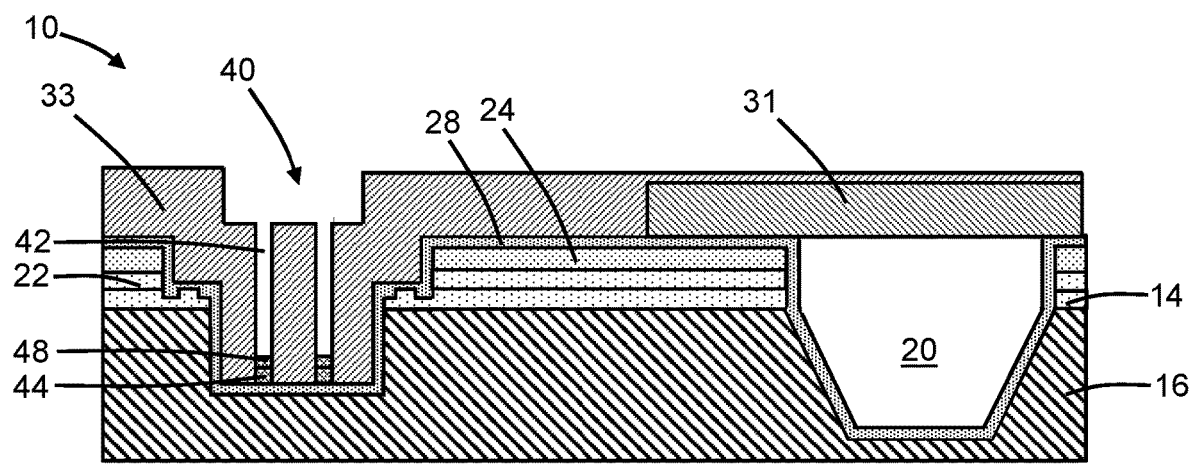
FIG. 10 is a cross-sectional view of the structure at a fabrication stage subsequent to FIG. 9.

With reference to FIG. 10 in which like reference numerals refer to like features in FIG. 9 and at a subsequent fabrication stage, the photoresist layers 30, 32 may be stripped and replaced by a set of photoresist layers 31, 33 that are substantially identical to the photoresist layers 30, 32. For example, the photoresist layer 31 may be comprised of a dry-film photoresist that bridges the opening 20, and the photoresist layer 33 may be comprised of a spin-on or spray-on liquid-based photoresist that includes a portion disposed inside the opening 40. The portion of the photoresist layer 33 inside the opening 40 may be patterned to form openings 46 that extend to areas on the photonics chip, namely respective surface areas of the redistribution layers 44. A solder bump 48 comprised of a metal, such as tin, silver, or a gold-tin alloy, may be formed by a plating process on each of the redistribution layers 44.

Figure 11:
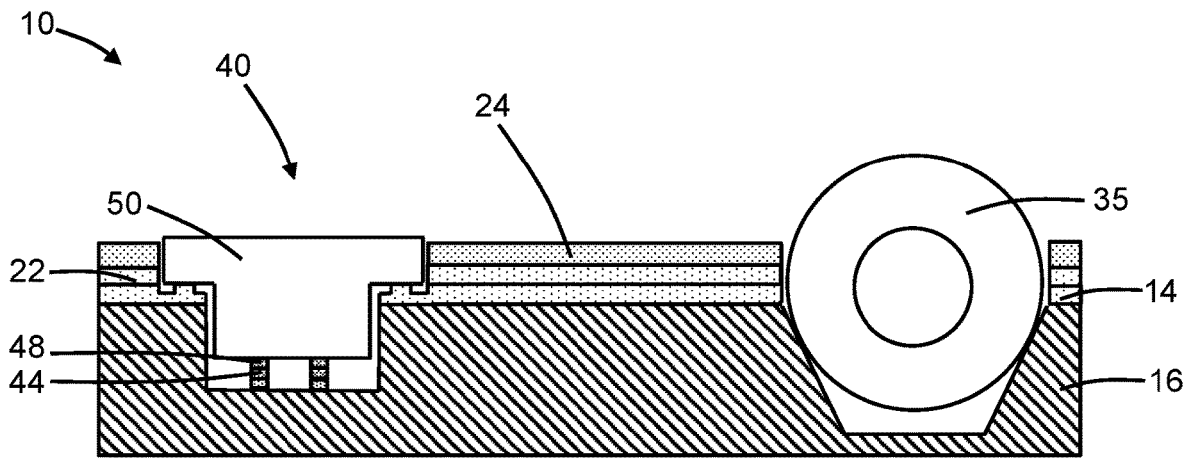
FIG. 11 is a cross-sectional view of the structure at a fabrication stage subsequent to FIG. 10.

With reference to FIG. 11 in which like reference numerals refer to like features in FIG. 10 and at a subsequent fabrication stage, the photoresist layers 31, 33 may be stripped, the layer 28 may be etched away except where masked by the redistribution layers 44 and solder bumps 48, the tip portion of the optical fiber 35 may be placed into the opening 20, and a chip 50 may be placed into the opening 40. In an embodiment, the chip 50 may have a shape and dimensions that are correlated with the shape and dimensions of the opening 40 such that the chip 50 can be inserted into the opening 40 and properly positioned. The chip 50 may include pads that are attached to the redistribution layers 44 inside the opening 40 by reflowing at least a portion of the solder bumps 48 to form solder joints that physically and electrically connect the pads of the chip 50 to the redistribution layers 44.

The chip 50 may be a laser chip having a laser that is configured to emit light (e.g., laser light) of a given wavelength, intensity, mode shape, and mode size, and that is arranged inside the opening 40 with a light output aimed toward an edge coupler, which may be similar to edge coupler 18 (FIGS. 1, 2), disposed adjacent to the edge of the opening 40. In an embodiment, the laser included in the chip 50 may be comprised of one or more III-V compound semiconductor materials. In an embodiment, the laser included in the chip 50 may be an indium phosphide/indium-gallium-arsenic phosphide laser that is configured to generate and emit continuous laser light in an infrared wavelength range. In an alternative embodiment, the chip 50 may be a semiconductor optical amplifier chip that is configured to amplify the optical power of laser light.

Figure 12:
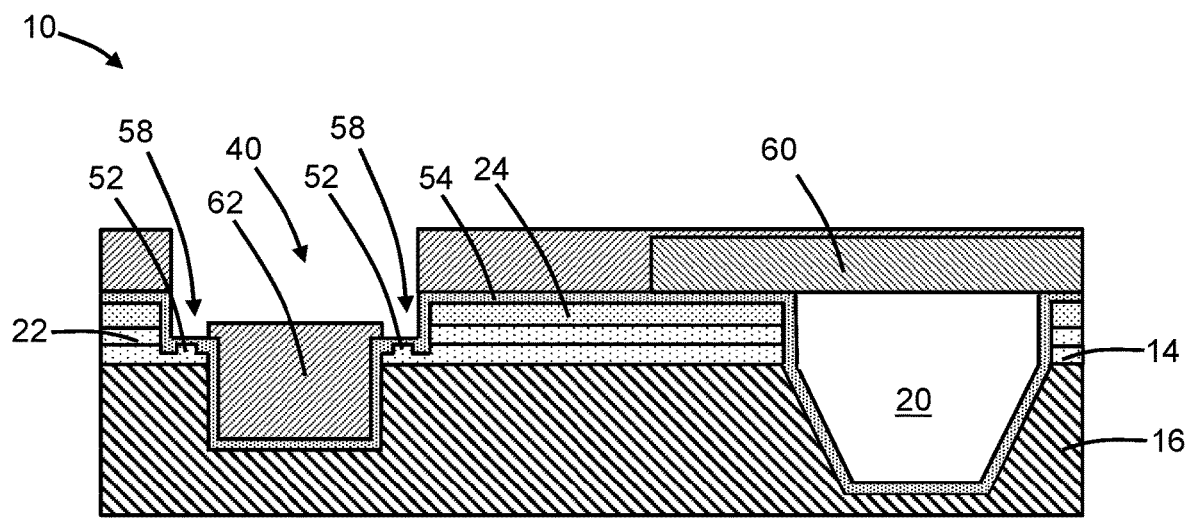
FIG. 12 is a cross-sectional view of a structure for a photonics chip at an initial fabrication stage of a processing method in accordance with alternative embodiments of the invention.

With reference to FIG. 12 and in accordance with alternative embodiments of the invention, the structure 10 may include mechanical stops 52 that are arranged inside the opening 40 and a dielectric layer 54 that is formed over the structure 10 as a coating. For example, the mechanical stops 52 may include patterned portions of the dielectric layer 14 that are disposed adjacent to the sidewalls of the opening 40. The mechanical stops 52 may be used to align a vertical height of the light output from the chip 50 (FIG. 11) with an edge coupler, which may be similar to edge coupler 18 (FIGS. 1, 2), that is situated at an edge of the opening 40. In that regard, the chip 50 may include side portions defining wings that contact the mechanical stops 52 when the chip 50 is placed into the opening 40 and attached to the photonics chip by reflowing the solder bumps 48. In an embodiment, the dielectric layer 54 may be comprised of a layer stack of conformal dielectric materials, such as a layer stack including conformal sublayers of silicon dioxide and silicon nitride, that is applied over the structure 10 as a moisture barrier.

A photoresist layer 60, which is substantially identical to the photoresist layer 30, may be formed, as described in connection with FIGS. 3, 3A, on the dielectric layer 54. The photoresist layer 60 may be comprised of a dry-film photoresist that bridges across the opening 20. In an embodiment, the photoresist layer 60 may bridge across the entirety of the opening 20. A photoresist layer 62, which is similar to photoresist layer 32, is then formed, as described in connection with FIGS. 4, 4A. The photoresist layer 62 may be comprised of a spin-on or spray-on liquid-based photoresist that includes a portion disposed inside the opening 40. The portion of the photoresist layer 62 inside the opening 40 may be patterned to form openings 58 that extend to the mechanical stops 52.

Figure 13:
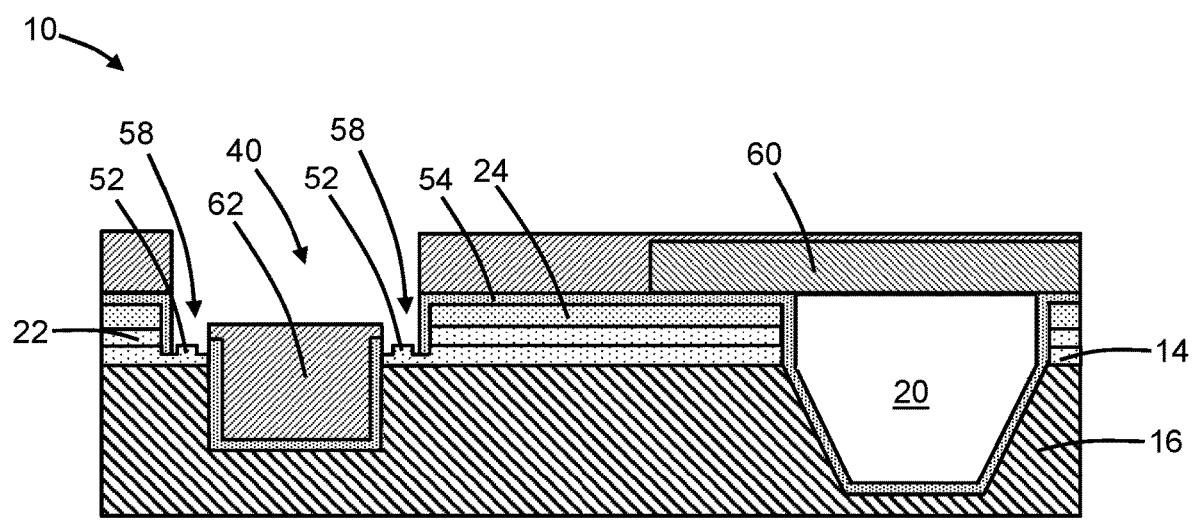
FIG. 13 is a cross-sectional view of the structure at a fabrication stage subsequent to FIG. 12.

With reference to FIG. 13 in which like reference numerals refer to like features in FIG. 12 and at a subsequent fabrication stage, the portions of the dielectric layer 54 exposed by the openings 58 may be removed by an etching process to reveal the mechanical stops 52. The process flow may proceed by removing the photoresist layers 60, 62, forming the redistribution layers 44 as described, for example, in connection with FIGS. 7-11, inserting the chip 50 into the opening 40, reflowing the solder bumps 48 either before or after die singulation to attached the chip 50 to the photonics chip, and inserting a portion of the optical fiber 35 into the opening 20 after die singulation.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present to provide indirect contact. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming a structure for a photonics chip, the method comprising:

forming a first opening in a semiconductor substrate of the photonics chip;
forming a first photoresist layer that bridges the first opening on a first portion of the photonics chip, wherein the first photoresist layer comprises a dry-film photoresist;
forming a second photoresist layer on a second portion of the photonics chip, wherein the second photoresist layer comprises a liquid-based photoresist;
patterning the second photoresist layer to form a second opening that extends to an area on the photonics chip;
forming a first electrical interconnect on the area of the photonics chip, wherein the first electrical interconnect is a redistribution layer;
removing the first photoresist layer and the second photoresist layer;
forming a third photoresist layer that bridges the first opening on the first portion of the photonics chip;
forming a fourth photoresist layer on the second portion of the photonics chip;
patterning the fourth photoresist layer to form a third opening that exposes the redistribution layer; and
forming a second electrical interconnect on the redistribution layer.

2. The method of claim 1 wherein the first photoresist layer is formed before the second photoresist layer is formed.

3. The method of claim 1 wherein the first photoresist layer and the second photoresist layer have unequal thicknesses.

4. The method of claim 1 wherein the first photoresist layer is formed by applying a sheet of the dry-film photoresist and patterning the sheet.

5. The method of claim 4 wherein the second photoresist layer is formed by applying the liquid-based photoresist with a spin-on process.

6. The method of claim 4 wherein the second photoresist layer is formed by applying the liquid-based photoresist with a spray-coat process.

7. The method of claim 1 wherein the second photoresist layer is disposed on the first photoresist layer on the first portion of the photonics chip, and the first photoresist layer bridges across an entirety of the first opening.

8. The method of claim 1 wherein the first photoresist layer and the second photoresist layer are removed after the first electrical interconnect is formed.

9. The method of claim 1 wherein the first electrical interconnect is formed by a plating process.

10. The method of claim 1 wherein the second opening is a cavity that is configured to receive a laser chip.

11. The method of claim 1 wherein the first opening is a groove that is configured to receive a tip portion of an optical fiber.

12. The method of claim 1 wherein the second opening reveals a mechanical stop within the area on the photonics chip.

13. The method of claim 1 wherein the second electrical interconnect is a solder bump.

14. The method of claim 13 wherein the second opening is a cavity that is configured to receive a laser chip.

15. The method of claim 13 further comprising:
a chip inside the second opening, the chip including a pad, wherein the solder bump comprises a solder joint that physically and electrically connects the pad of the chip to the redistribution layer.

16. The method of claim 15 wherein the chip is a laser chip.

17. The method of claim 15 wherein the chip is a semiconductor optical amplifier chip.

18. The method of claim 13 wherein the solder bump is formed by a plating process.

19. The method of claim 1 wherein the redistribution layer comprises one or more metals.

20. The method of claim 7 wherein the first photoresist layer blocks the liquid-based photoresist of the second photoresist layer from entering the first opening.

* * * * *